(12) United States Patent
Castellanos

(10) Patent No.: US 7,146,359 B2
(45) Date of Patent: Dec. 5, 2006

(54) METHOD AND SYSTEM FOR FILTERING CONTENT IN A DISCOVERED TOPIC

(75) Inventor: Maria G. Castellanos, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 10/138,950

(22) Filed: May 3, 2002

(65) Prior Publication Data

US 2003/0208485 A1 Nov. 6, 2003

(51) Int. Cl.
*G06F 17/30* (2006.01)
(52) U.S. Cl. .................. 707/5; 707/3; 707/4; 715/500; 717/11
(58) Field of Classification Search .............. 707/3, 707/4, 5, 6, 10, 104.1; 717/11; 715/500
See application file for complete search history.

(56) References Cited

U.S. PATENT DOCUMENTS 6,026,388 A * 2/2000 Liddy et al. ................. 707/1
6,269,368 B1 * 7/2001 Diamond ....................... 707/6
6,587,848 B1 * 7/2003 Aggarwal et al. ............. 707/3
2003/0069873 A1 * 4/2003 Fox et al. ....................... 707/1

* cited by examiner

*Primary Examiner*—Jeffrey Gaffin
*Assistant Examiner*—Hassan Mahmoudi

(57) ABSTRACT

A method of filtering content in a discovered topic. In one embodiment, a method for filtering content in a discovered topic is comprised of preprocessing querying data. The querying data has caused retrieval of a collection of documents. The collection of documents includes documents containing subject matter related to said querying data. The collection of documents also includes documents containing subject matter extraneous to the querying data. The querying data is clustered. Clustering of the querying data enables the discovered topic to be identified. The collection of documents are postfiltered. The postfiltering of the collection of documents generates a collection of documents having the related subject matter, and extraneous subject matter is excluded.

22 Claims, 8 Drawing Sheets

610 — PRONTOIDS in node 0,0 labeled sendmail mail unknown
611 — SOM label: Sendmail
612 —
                                                                                            613

| PRONTOID | TITLE | DOCTYPE | QUERIES | TERMS |
|---|---|---|---|---|
| 158845 | Sendmail Unable to qualify own domain name; wants to run smtp | RCEN | 12 | 12 |
| 154687 | Unable to Qualify my own domain name, using short name | RCEN | 9 | 11 |
| 159317 | SENDMAIL: Configuring a local domain | RCEN | 14 | 9 |
| 156612 | Mail: Information recorded at each sendmail logging level | RCEN | 2 | 3 |
| 156080 | HP-UX 10.20: Receive errors when attempting to use sendmail | RCEN | 15 | 11 |
| 156610 | Mail: Outgoing mail header has no hostname in header | RCEN | 4 | 5 |
| 154442 | sendmail: error 550 userid user unknown | RCEN | 3 | 7 |
| 157276 | sendmail: limiting the size of e-mails | RCEN | 7 | 10 |
| 154465 | sendmail: cf's DS does not run when DNS is active | RCEN | 4 | 2 |
| 139499 | Security Vulnerability in Sendmail | SECH | 7 | 6 |
| 150980 | Can't start new process on server because swap is busy at 100% | RCEN | 2 | 6 |
| 155393 | What version of sendmail is shipped with HP-UX 11.0 | RCEN | 7 | 5 |

710 — PRONTOIDS in node 12,2 labeled serviceguard mc/serviceguard cmcld
711 — SOM label: serviceguard
712 —
                                                                              713

| PRONTOID | TITLE | DOCTYPE | QUERIES | TERMS |
|---|---|---|---|---|
| 159105 | ServiceGuard : SG fails to start after upgrade, binary file not u | RCEN | 6 | 3 |
| 159589 | SG 10.10 and EMC symmetric vgchange-a e fails in cmapplyconf | RCEN | 6 | 7 |
| 153331 | SG cluster failed to start on 2nd node; /usr/lib/cmcld didn't ma | RCEN | 3 | 5 |
| 159349 | MC/ServiceGuard: Serial heartbeat port hung up | RCEN | 4 | 3 |
| 158538 | HP-UX: Starting MC/ServiceGuard error-not a vxfs file system | RCEN | 6 | 5 |
| 158594 | SERVICEGUARD: cmrunmode fails after upgrade | RCEN | 2 | 1 |
| 159355 | SG: Start ServiceGuard automatically on reboots, and disable pac | RCEN | 2 | 1 |

810 — PRONTOIDS in node 32,10 labeled y2k 10.20 patch
811 — SOM label: y2k
812

| PRONTOID | TITLE | DOCTYPE | QUERIES | TERMS |
|---|---|---|---|---|
| 156785 | Where can I find year-2000 compatibility information | RCEN | 63 | 20 |
| 157355 | RCS in Y2K (Year 2000 Compliant) with patch(es) | RCEN | 20 | 8 |
| 151212 | Application Release 9/97 Product Summaries | DVAN | 8 | 12 |
| 158063 | non existent | none | 1 | 1 |
| 157650 | passwd-s is not Year 2000 (y2k) safe | RCEN | 7 | 7 |
| 158402 | Example of upgrade for firmware on Vclass Symbios disk controll | RCEN | 1 | 2 |
| | | | | |
| | | | | |

FIGURE 8

METHOD AND SYSTEM FOR FILTERING CONTENT IN A DISCOVERED TOPIC

TECHNICAL FIELD

The present invention relates to topic discovery and filtering extraneous subject matter from discovered preferred subject matter.

BACKGROUND ART

In today's world of electronic communication, nearly every organization (e.g., a corporation, a company, an enterprise (commercial or non-profit) and so on) has an Internet accessible Web site with which they can make their information available to the customer. A Web site has become such an integral part of an organization's resources that nearly all organizations are constantly trying to improve the customer's experience during interaction with their Web site. This desire to provide a pleasant experience is especially prevalent during a customer's search for specific information within that organization's Web site. Because there are many organizations that have literally millions of documents available to their customers, it is important for an organization to facilitate an efficient search, navigation, and information retrieval process for the customer.

For an example, when a customer has a software problem, the customer can either submit a case to have a support engineer find a solution for their problem or they can try to self-solve it by searching the collection with the hope of finding a solution document for the problem. If, according to the customer's experience, self-solving can be done efficiently, it is likely that they will return to the site to self-solve problems when they arise. However, if the customer finds it difficult to find the right solution document, there is a high probability that the customer will exit the self-solve area, open a case with a company's customer service department, and in all likelihood, refrain from further attempts at self-solving their problems.

In another example, if a customer comes to an organization's Web site and spends an inordinate amount of time trying to find their particular information, the customer can become frustrated at the lack of success with their search. This can create an unsatisfied customer who may opt to utilize a competitor's Web site, and perhaps their product. If, on the other hand, the navigation within the organization's Web site is simple and a customer can easily search for and retrieve the desired information, that customer is more likely to remain a loyal customer.

Accordingly, it is important for an organization to identify the customer's most important information needs, referred to as the hot information needs. It is also important to provide, to the customer, those documents that contain that information, and to organize the information into hot topics.

One way to facilitate the information search and retrieval process is to identify the most FADs (frequently accessed documents) and to provide a straightforward means to access the documents, by, for example, listing the FADs in a hot documents menu option within a primary web page (e.g., home page) of an organization's Web site. The underlying assumption is that a large number of users will open these documents listed in the hot documents menu option, thus making the typical search and retrieval process unnecessary. However, it is common for the list of FADs to be quite large, up to hundreds or thousands of documents. It has been determined that some customers would prefer to have the FADs grouped into categories or topics. When there is no predefined categorization into which the FADs can be placed, the needs arises to discover categories or topics into which those FADs can be placed.

Categorizing documents into a topic hierarchy has conventionally been accomplished manually or automatically according to the contents of the documents. It is appreciated that the manual approach has been the most successful. For example, in Yahoo, the topics are obtained manually. However, even though the documents in Yahoo are correctly categorized, and the categories (topics) are natural and intuitive, the manual effort to determine the categories is monumental and is conventionally accomplished by domain experts. In response to the monumental task of manual categorization of documents, many efforts have been dedicated to create methods that can accomplish document categorization automatically. It is appreciated that of the automatic categorization methods created, very few, if any, have had results comparable to manual categorization, e.g., the resulting categories are not always intuitive or natural. It is further appreciated that the topic hierarchy described above is predicated upon document content categorization methods which commonly produce results, e.g., topics, that are quite different from the customer's information needs and perspective.

Because organizations need to be cognizant of their customer's interests to better serve them, knowing which topics and corresponding documents are of most interest to their customers, organizations can thus organize their web sites to better serve their clientele. Discovering hot topics according to the user's perspective can be useful when the quality of the hot topics are high (meaning that the documents in a hot topic are really related to that topic), users can rely on them to satisfy their information needs. However, due to user browsing tendencies, often driven by curiosity or ignorance, the clicking may be noisy, (e.g., going to and/or opening unnecessary/uninformative/unrelated sites and/or documents) which can lead to hot topics contaminated with extraneous documents that do not belong in the categories in which they are disposed.

Therefore conventional means of presenting relative information, e.g., hot topics, FAD's, and the like, has disadvantages because of the vast number of documents that are available as well as the fact that those documents may not be placed in categories that match a user's perspective. Furthermore, the prior art is limited in the manner in which the documents are categorized, conventionally requiring numerous experts to commit a great deal of time to attempt to properly categorize the documents. In addition, the prior art suffers from an inability to filter out the extraneous documents from those documents that contain the desired information related to the customers needs.

DISCLOSURE OF THE INVENTION

A method for content filtering of a discovered topic is disclosed. In one embodiment, a method of content filtering in a discovered topic is comprised of preprocessing querying data. The querying data caused a retrieval of a collection of documents. The collection of documents is comprised of documents having content comprising related subject matter, relative to the querying data. The collection of documents is further comprised of documents having content comprising extraneous subject matter, relative to the querying data. The collection of documents are clustered in accordance with the querying data, the clustering enabling said discovered topic to be identified. The collection of documents are postfiltered. The postfiltering generates a collection of documents having content comprising said related subject matter relative to said topic, and said extraneous subject matter is excluded.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 6 is an illustration of a displayed list of documents contained in a node within a self-organizing map, in accordance with one embodiment of the present invention.

FIG. 7 is an illustration of a displayed list of documents contained in another node within a self-organizing map, in accordance with one embodiment of the present invention.

FIG. 8 is an illustration of a displayed list of documents contained in yet another node within a self-organizing map, in accordance with one embodiment of the present invention.

BEST MODES FOR CARRYING OUT THE INVENTION

Figure 1:
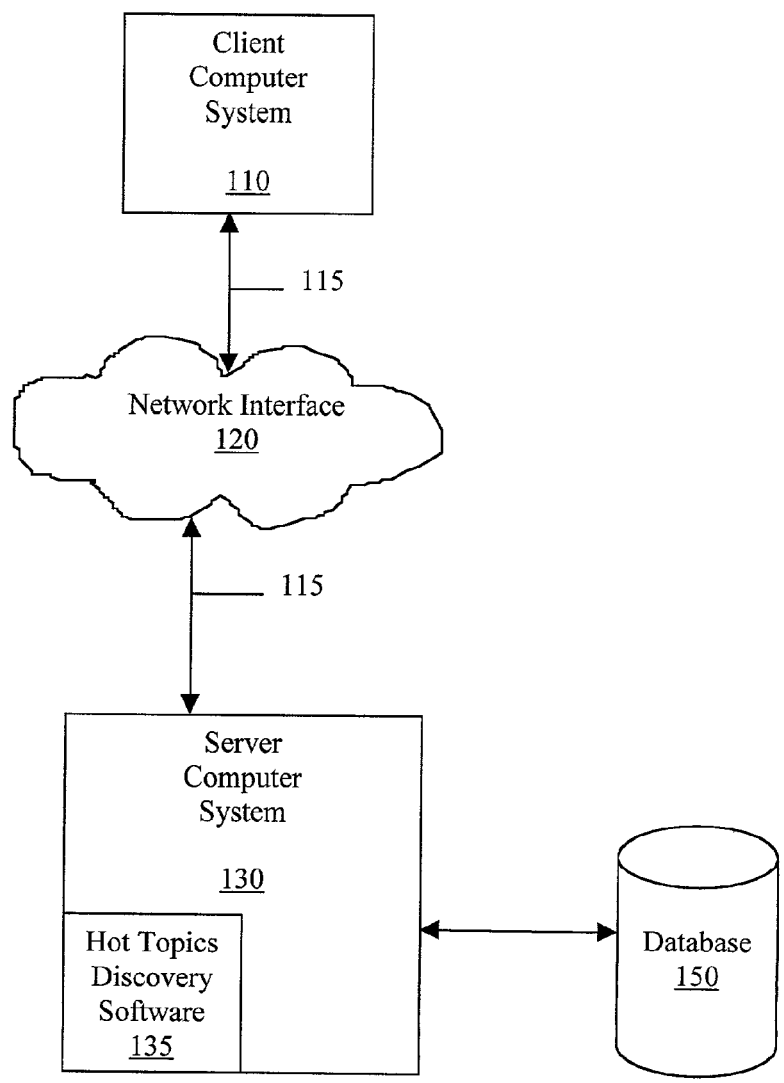
FIG. 1 is a block diagram of an exemplary network environment in which the embodiments of the present invention may be practiced, in accordance with one embodiment of the present invention

A method and system for discovering high quality hot topics, from a user's perspective, and filtering extraneous documents therefrom is described. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Hot topics are discovered by collecting the queries after which documents were opened, representing a document as the collection of queries that opened that document, vectorizing the representations, and clustering the vectors to discover the general hot topics. Then the actual contents of the documents are collected, vectorized, and used to filter out those documents that contain extraneous subject matter from a hot topic, and the remaining documents are then labeled to more precisely identify the hot topic, relative to a user's informational needs.

Advantages of embodiments of the present invention, as will be shown, below, are not only that it discovers hot topics but also that these topics correspond to the users' perspective and the quality of the hot topics can be tuned according to the desired values of precision and recall. Additionally, by providing hot topics related to a user's most current informational needs, a company can further provide an easy and simple means for disseminating those hot topics to their customers, in a dynamic and reliable fashion. Further, by making these hot topics directly available to a customer, the need for a customer to go through some arduous task of searching a company's Web Site is all but eliminated. This simplification of the search process will not only save a company substantial amounts of money by reducing the need for online technical support experts, but can increase a company's revenues by satisfying customer's needs and, thus, the customer becomes a loyal and continued customer.

Embodiments of the present invention are discussed primarily in the context of providing high-quality hot topics containing information of paramount importance to a customer via a network of computer systems configured for Internet access. However, it is appreciated that embodiments of the present invention can be utilized by other devices that have the capability to access some type of central device or central site, including but not limited to portable computer systems such as a handheld or palmtop computer system, laptop computer systems, cell phones, and other electronic or computer devices adapted to access the Internet and/or a server system.

FIG. 1 is a block diagram illustrating an exemplary client-server computer system network 100 upon which embodiments of the present invention may be practiced. Network 100 may be a communication network located within a firewall of an organization or corporation (an "Intranet"), or network 100 may represent a portion of the World Wide Web or Internet. Client (or user) computer system 110 and server computer system 130 are communicatively coupled via communication lines 115 and network interface 120. This coupling via network interface 120 can be accomplished over any network protocol that supports a network connection, such as IP (Internet Protocol), TCP (Transmission Control Protocol), NetBIOS, IPX (Internet Packet Exchange), and LU 6.2, and link layers protocols such as Ethernet, token ring, and ATM (Asynchronous Transfer Mode). Alternatively, client computer system 110 can be coupled to server computer 130 via an input/output port (e.g., a serial port) of server computer system 130; that is, client computer system 110 and server computer system 130 may be non-networked devices. Though network 100 of FIG. 1 is shown to include one server computer system 130 and one client computer system 100, respectively, it is appreciated that more than one server computer system 130 and more than one client computer system 110 can be present.

Server computer system 130 has an instancing of hot topics discovery software 135 disposed therein. Hot topics discovery software 135 is adapted to provide discovery of hot topics as well as to provide filtering of extraneous documents, such that those documents containing the preferred subject matter (hot topic), from a user's perspective, are presented. The data accessed and utilized by hot topics discovery software 135 to filter the extraneous documents is stored in a database 150. Database 150 is communicatively coupled with server computer system 130. It is appreciated that hot topics discovery software 135 is well suited to interact with any number of client computer systems 110 within exemplary network 100.

Figure 2:
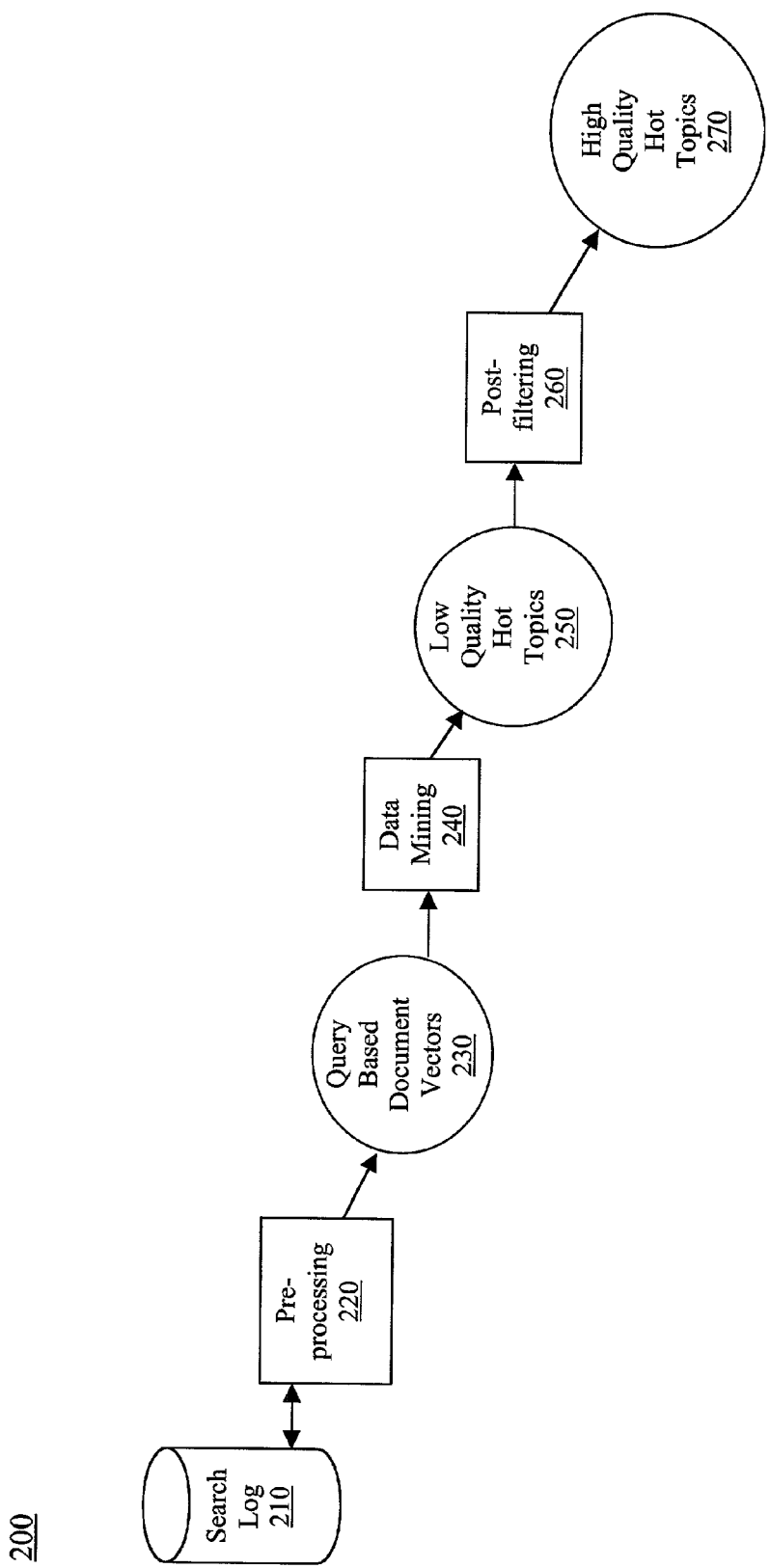
FIG. 2 is block diagram of a process of filtering extraneous document from hot topics, in accordance with one embodiment of the present invention.

FIG. 2 is a block diagram of a process 200 for discovering high quality hot topics, in one embodiment of the present invention. Although specific steps are disclosed in process 200, such steps are exemplary. That is, the present invention is well suited to performing various other steps or variations of the steps recited in process 200 of FIG. 2. Within the present embodiment, it should be appreciated that the steps of process 200 may be performed by software, by hardware or by any combination of software and hardware.

In FIG. 2, preprocessing 220 involves several steps. Initially, the data contained in a search log, e.g., search log 210, is collected. Search log 210 is disposed in a database, e.g., database 150 of FIG. 1. Search log 210 can contain data from a plurality of logs, e.g., a usage log, a query log, and web log, as shown in Tables One, Two, and Three, respectively. Subsequently, the data is then cleaned. Data cleaning or scrubbing can include, but is not limited to, removing some entries from search log 210, normalizing the query terms, removing special symbols, eliminating stop words, stemming, and the like. The data is then transformed into a collection of query based vectors, where each document has an associated vector. Because it is desired to determine the hot topics, from a user's perspective, the querying data which triggered the retrieval of the documents is used, instead of the contents of the documents, as a basis for calculating vectors during the data transformation. Additionally, because it is quite common to have a large number of query words that caused retrieval of the documents, a feature selection technique is implemented to select the most relevant of the query words.

Still referring to FIG. 2, upon completion of preprocessing 220, the resulting information, e.g., query based documents vectors 230, is utilized in conjunction with data mining 240. Data mining 240 comprises of grouping the vectors into clusters using standard clustering algorithms. Examples of clustering algorithms include, but are not limited to, k-means and farthest point. The resulting clusters represent generalized hot topics, e.g., low quality hot topics 250.

Still with reference to FIG. 2, subsequent to determining the generalized hot topics, a postfiltering process, e.g., postfiltering 260 is then performed. Postfiltering 260 includes, but is not limited to, data collection, data cleaning, data transformation, and extraneous document identification. In data collection, instead of the query data being collected as described above, the contents of the retrieved documents are collected. In data cleaning, the contents of the documents are cleaned, analogous to query data cleaning, but also including header elimination and HTML stripping. In data transformation, the contents of the documents are transformed into numerical vectors based on the document content. An alternative feature selection technique is utilized, as well as assigning to each element of the vector a weight using a conventional TD-IDF measure to calculate their importance. A TD-IDF measure is where TF corresponds to the frequency of the term in the document and IDF corresponds to the inverse of the number of documents in which the term appears to calculate the vectors.

Still with reference to postfiltering 260 of FIG. 2, subsequently the extraneous documents are identified. Extraneous document identification is comprised of similarity computation and filtering. Similarity computation includes, but is not limited to, computing the similarity of each document against each of the other documents within a cluster previously obtained in step 240. The distance, e.g., the cosine distance, is used to compute the cosine angle between the vectors, as a metric of their similarity. From these similarities, the average similarity of each document relative to the other documents within the cluster is computed, and then a cluster average similarity is computed from the average similarities of each document in the cluster.

Filtering is comprised of setting a similarity threshold for identifying candidate extraneous documents, the threshold being dependent upon allowed cluster average similarity deviation.

Figure 3:
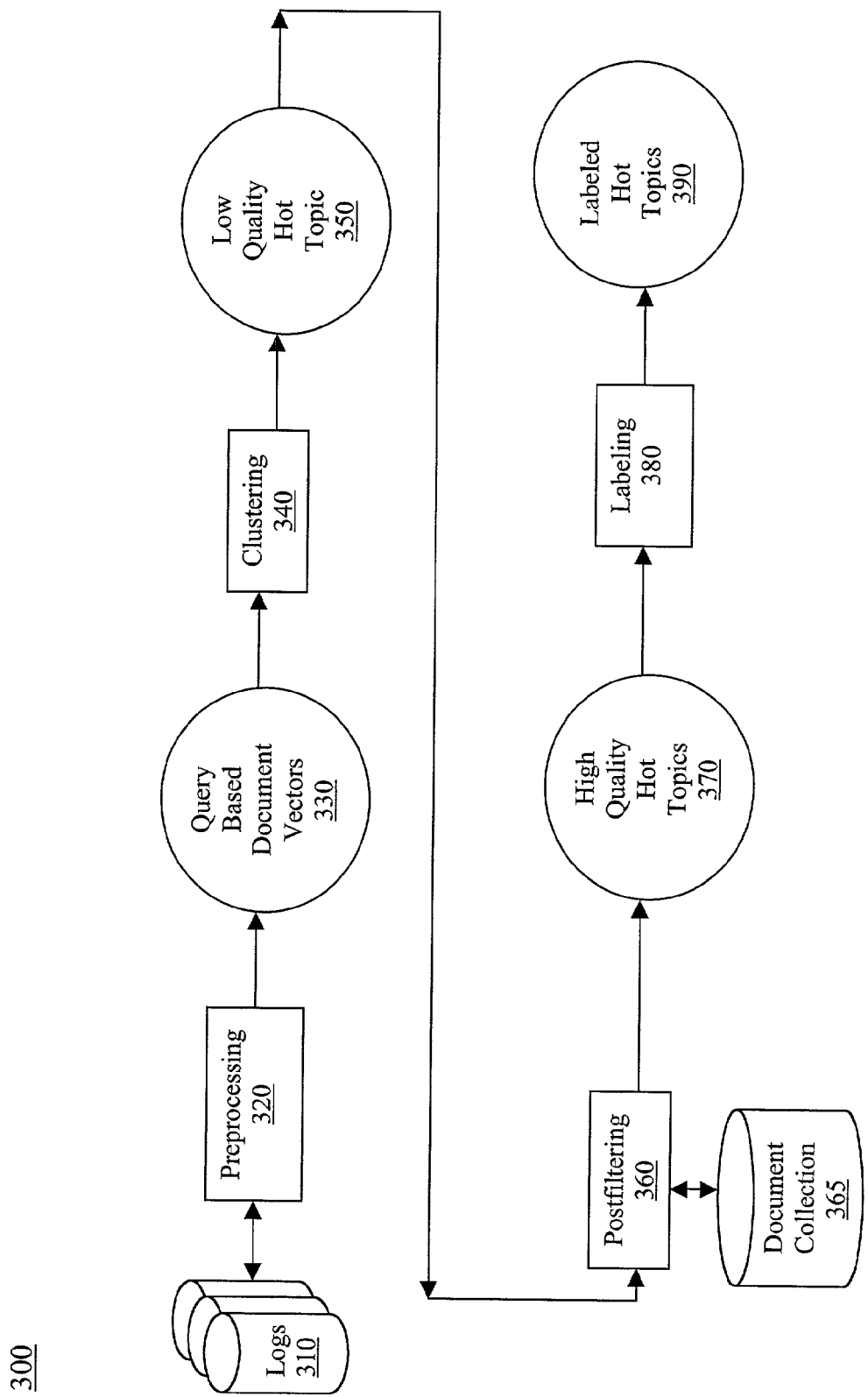
FIG. 3 is a block diagram of a process of filtering extraneous documents from hot topics, in accordance with one embodiment of the present invention.

FIG. 3 is a block diagram of a process 300 for filtering extraneous documents from hot topics, in one embodiment of the present invention. Although specific steps are disclosed in process 300, such steps are exemplary. That is, the present invention is well suited to performing various other steps or variations of the steps recited in process 300 of FIG. 3. Within the present embodiment, it should be appreciated that the steps of process 300 may be performed by software, by hardware or by any combination of software and hardware. It is noted that process 300 of FIG. 3 is analogous to process 200 of FIG. 2 with the following addition. Subsequent to the completion of postfiltering which results in high quality hot topics, the hot topics are labeled. Once the extraneous documents have been removed from the clusters, each cluster is labeled to name the topic that the cluster represents. Labeling can be performed manually, by a human who uses their experience and background knowledge, also referred to as a domain expert, who assigns a semantic label to the topic represented by the clusters. Labeling can also be performed automatically, by analyzing the words in the documents to find the most common words that appear in more that half of the documents, and those words will be used to label the topic of the cluster.

Figure 4:
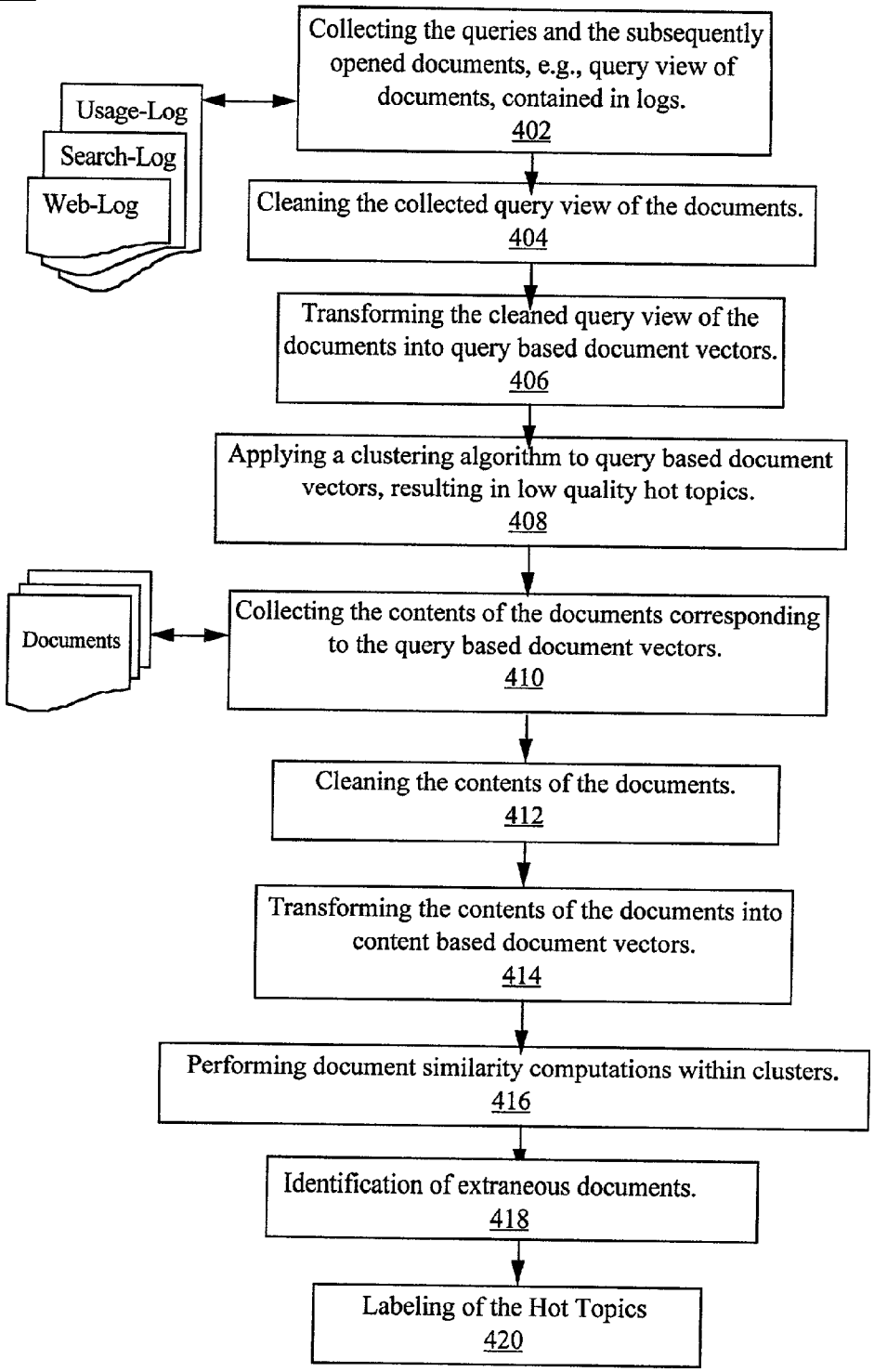
FIG. 4 is a flow chart of a process of filtering extraneous documents from hot topics, in accordance with one embodiment of the present invention.

FIG. 4 is a flowchart 400 of steps performed in accordance with one embodiment of the present invention for filtering extraneous documents from hot topics. Flowchart 400 includes processes of the present invention which are carried out by processors and electrical components under the control of computer readable and computer executable instructions. The computer readable and computer executable instructions reside, for example, in data storage features such as computer usable volatile memory and/or computer usable non-volatile memory. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software, by hardware or by any combination of software and hardware.

In one embodiment of the present invention, four stages are used to provide high quality hot topics. The four stages are preprocessing (steps 402, 404, and 406 of FIG. 4), clustering (steps 408 of FIG. 4), post-filtering (steps 410, 412, 414, 416, and 418 of FIG. 4), and labeling (step 420 of FIG. 4).

In step 402 of FIG. 4, raw material regarding the searches performed by a user and the documents opened is collected. The raw material is the data that is contained within an organization's search log, such as logs stored in a data storage device, e.g., a hard disk drive or other data storage device which is disposed in a computer system within a network. The search logs provide complete information about the searches performed by users, e.g., the queries formulated by the users, the documents retrieved in response to the queries, and which of those documents they subsequently opened. It is appreciated that a user can, in one embodiment, initiate those searches through a computer system, e.g., a client computer system communicatively coupled to a network and configured to access a server computer via the Internet or an Intranet. It is further appreciated that data collecting can take different forms depending on the configuration of the logs.

Still referring to step 402 of FIG. 4, it is appreciated that, in many instances, a search log doesn't exist, per se, but is compiled from several other logs. In one embodiment, and for purposes of the present disclosure, the search log consists of three logs, e.g., a usage-log, a query-log, and a web-log. It is appreciated that in other embodiments, additional and/or alternative logs can also be included in the search log.

A usage-log records information on the different actions that are performed by the users. For example, doing a search (doSearch) or opening a document from the list of search results (reviewResultsDoc). Exemplary usage log entries are shown in Table One.

TABLE ONE

| Time-stamp | Access Method | User ID | Remote Machine | Subject Area | Transaction Name |
|---|---|---|---|---|---|
| --- --- - | | | | | |
| 08:35:14 | HTTP | CA1234 | 166.88.534.432 | atq | doSearch |
| 08:36:55 | HTTP | CA1234 | 166.88.534.432 | ata | reviewResultsDoc |

A query-log captures the query strings formulated by the user and therefore records information on each query posed after a doSearch action. An exemplary search log is shown in Table Two.

TABLE TWO

| Timestamp | User ID | Remote Machine | Mode | Query String |
|---|---|---|---|---|
| Oct. 1,1999 08:35:39 | CA1234 | 166.88.534.432 | Boolean | y2k |

A web-log contains the URLs (uniform resource locators) of each web page (i.e. document) opened, and therefore it records information on the documents retrieved after a reviewResultsDoc action. An exemplary web-log is shown in Table Three.

TABLE THREE

| Timestamp | Remote Machine | URL |
|---|---|---|
| Jan. 10, 1999 08:43:37 | 166.88.534.432 | "GET/ata/bin/doc.p1/?DID=15321 HTTP/ 1.0" |

It is necessary to correlate the usage, search and web logs to obtain a relation between the searches performed by the users and the corresponding documents opened as a result of those searches. The usage and query logs are first correlated to obtain the time at which a query was formulated. Subsequently, correlating the usage logs and the query logs with the web log determines, in one embodiment, which documents were opened after the subsequent reviewResultsDoc action in the usage log but before the timestamp of the next action performed by that user. In many instances, timestamps in the different logs are not synchronized, complicating the process of correlating entries of the logs, and accordingly, sequential numbering needs to be used to overcome a lack of synchronization of the clocks in the different logs. The resulting "query view" of three documents is shown in an exemplary manner in Table Four.

TABLE FOUR

| Document | Query String |
|---|---|
| 15321 | Y2k; 2000 compatibility; year 2K ready; |
| 539510 | Omniback backup; recovery; OB; |
| 964974 | sendmail host is unknown; sender domain sendmail; mail debug; sendmail; mail; mail aliases; |

It is noted that because of the desire to obtain topics that match the users perspective, instead of the conventional manner which views the contents of documents to determine hot topics, embodiments of the present invention are drawn to discovering the hot topics by mining the data in a search log. A search log can include, but is not limited to, the query log, the usage log, and the web log, as described above. Viewing the documents by the collection of queries that have been posed against them, for example, for each document, all the queries that resulted in opening that document are associated therewith, and which results in a query view of a document. For example, in Table Four, above, the query view of document 964974 indicates that: a) sendmail host is unknown; b) sender domain sendmail; c) mail debug; d) sendmail; e) mail, and f) mail aliases; were the queries after which document 964974 was opened. It is further noted that embodiments of the present invention can restrict the document-query relation to a given number of the hottest (i.e. more frequently accessed) documents. This is quite useful when a hot topics service only contains hot documents in the hot topics.

In step 404 of FIG. 4, subsequent to the collection of the data, the entries of the document-query relation need to be cleaned or scrubbed. The process of scrubbing can include, but is not limited, to removing some entries from the relation, and removing special symbols such as *, #, &, @, and so on. Additionally, scrubbing can include eliminating stop words. Stop words are common words that do not provide any content. Examples of stop words can include, but is not limited to; the, from, be, product, of, for, manual, user, and the like. Both a standard stop word list readily available to the IR (information retrieval) community and a domain-specific stop word list, created from analyzing the collection of queries can be utilized. Scrubbing can further include normalizing query terms to obtain a uniform representation of concepts through string substitution, e.g., by substituting the string "HP-UX" for "HP Unix." Normalizing tools for analyzing typographical errors, misspellings, and ad-hoc abbreviations can also be utilized during normalization. Scrubbing can also include stemming which identifies the root form of the word by removing suffixes, e.g., recovering which is stemmed as recover, initiating which is stemmed as initiate, and the like.

In step 406 of FIG. 4, once the cleaning of the entries of the document-query relation is completed, each cleaned entry of the document-query relation is transformed into a numerical vector to be mined in the second stage, clustering. From this transformation, we obtain a set of vectors V, with one vector per document consisting of elements, e.g., $w_{ij}$, which represent the weight or importance that word j has in document i. This weight is given by the probability of word j in the set of queries posed against document i as shown in the following example. For the set of queries for document 964974 as shown in Table Four (sendmail, mail, sender domain sendmail, mail aliases, sendmail host unknown, mail debug), the vector representation for document 964974 is shown in Table Five, in one embodiment.

TABLE FIVE

| sendmail | mail | sender | domain | aliases | host | unknown | debug |
|---|---|---|---|---|---|---|---|
| 0.25 | 0.16 | 0.08 | 0.08 | 0.08 | 0.08 | 0.08 | 0.08 |

Since the number of different words that appear in a large collection of queries can be quite large, a technique such as feature selection is utilized to select a set of the most relevant words to be used as the dimensions of the vectors. The simple technique of selecting the top n query words that appear in the query view of the document collection with the condition that each such word appears in at least two documents can be used to select the dimensions for the vectors. Phrases with more than one word can also be used. However, in nearly all instances, multi-word phrases do not add any value. In one embodiment, Table Six, below, shows the set of vectors V organized into a document x word matrix, where each horizontal row corresponds to a document vector and each vertical column corresponds to a feature.

TABLE SIX

| | Word 1 | Word 2 | ... | Word n |
|---|---|---|---|---|
| Doc 1 | w11 | w12 | | w1n |
| Doc 2 | w21 | w22 | | w2n |
| ... | | | | |
| Doc m | wm1 | wm2 | | wmn |

In step 408 of FIG. 4, and subsequent to the completion of preprocessing, as described above, the next stage is clustering. In the clustering stage, step 408, the vector representation of the query view of the documents is mined to find hot topics that match the user's perspective. Groups of documents that are similar with respect to the users' information needs will be obtained by clustering documents represented as a collection of points s in a multidimensional space $R^d$ where the dimensions are given by the features selected using, for example, the feature selection technique as described above. Numerous definitions of clustering exist and for each definition there are multiple algorithms, such as those described in Chapter 10 of the book "Unsupervised Learning and Clustering" by R. O. Duda, et al.

For example, utilizing a clustering definition known as the k-median measure: given a collection of points s in a multidimensional space S and a number k of clusters, find k centers in S such that the average distance from a point in S to its nearest center is minimized. While finding k centers is NP-hard, numerous algorithms exist that find approximate solutions. Nearly any of these algorithms, such as k-means, farthest point or SOM (Self-Organizing Map) can be applied to the document x word matrix given in Table Six. The resulting interpretation of the clusters of documents based upon query based vectors represents low quality hot topics.

Although the above method is independent of the clustering definition and algorithm used, experimentation is recommended to find the algorithm that works best for the domain at hand, e.g., the algorithm that finds the most accurate hot topics.

Subsequent to the completion of clustering, the next stage is postfiltering (steps 410, 412, 414 and 416 of FIG. 4). The query view of the documents relies on an assumption that users will open documents that correspond to their search needs. In practice, however, users often exhibit a random behavior driven by curiosity or ignorance. Under this random behavior, users open documents that do not correspond to their search needs, but that the search engine returned as a search result due to the presence of a search term somewhere in the document. In this instance, the query view of the document erroneously contains the search string and will likely be misplaced in a cluster related to that search string.

For example, a document on the product Satan is returned as a result for the query string "year 2000" since it contains a telephone extension number "2000", even though it is not related to "year 2000." Users tend to open the Satan document, driven somewhat by the curiosity of what the Satan document may contain. Thus, the query view of the Satan document contains the search string "year 2000" which makes it similar to documents related to Y2K and whose query view also contains the string "year 2000." Hence, the Satan document ends up in a cluster corresponding to the Y2K topic. These extraneous documents that appear in topics to which they do not strictly belong constitute noise that negatively impacts the quality of the topics. Since users will not rely on a hot topics service with low quality, it is necessary to clean up the hot topics by identifying extraneous documents and filtering them out. This is accomplished by computing the similarity of the documents according to their content, i.e. their content view, and designating as candidates those with a low similarity to the rest of the documents in their clusters.

The process of postfiltering is comprised of the following steps. In step 410 of FIG. 4, the actual contents of the documents are retrieved, instead of collecting the data that caused the retrieval of the document, as described above, in step 402 of FIG. 4.

In step 412 of FIG. 4, subsequent to the retrieval of the actual contents contained in the documents, data cleaning is performed upon the contents. The contents of the documents are scrubbed, analogous to the scrubbing performed in the preprocessing stage, as described above, with the following additions. Header elimination and HTML stripping are necessary and performed prior to the scrubbing, which includes, but is not limited to special symbol removal, stop word elimination, normalization, and stemming. Header elimination is performed to remove the meta information that is added to the document, but is not part of the actual content of the document, and as such need to be removed. HTML stripping is performed to eliminate the HTML tags from the documents.

In step 414 of FIG. 4, subsequent to the scrubbing of the document, including HTML and header elimination, as described above, the content of the document, is transformed. The document's content is transformed into numerical vectors, somewhat analogous to the transformation as described in above. However, in this transformation, the set of different terms is much larger and the technique utilized for selecting features consists of, in one embodiment, first computing the probability distributions of terms in the documents and subsequently selecting the k terms in each document that have the highest probabilities and that appear in at least two documents. Also, the weight $W_{ij}$ for a term j in a vector i is computed differently by using for example, a slightly modified standard TF-IDF (term frequency-inverse document frequency) measure. The formula utilized for the computation of the weight $W_{ij}$ is shown below in Formula One (F1).

$$W_{ij}=K_{ij}[tf_{ij}\log(N/df_j)] \tag{F1}$$

where:
- $tf_{ij}$=the frequency of term j in document i,
- $df_j$=the document frequency of term j, and
- $K_{ij}$=is a factor that provides the flexibility to augment the weight when term j appears in an important part of document i, e.g., the document title.

The default value for K is 1. The interpretation of the TF-IDF measure is, that the more frequently a term appears in a document, the more important it is, but the more common it is among the different documents, the less important it is since it loses discriminating power. The weighted document vectors form a matrix similar to the matrix that is shown in Table Six, but the features in this matrix are content words as opposed to query words.

Subsequent to document transformation, as described above, a process for the identification of extraneous document is performed. The extraneous document identification process is comprised of two sub-processes. One of the two sub-processes is similarity computation, e.g., step 416 of FIG. 4, and the other sub-process is the actual identification of extraneous documents, e.g., step 418 of FIG. 4.

Still referring to step 416 of FIG. 4, in similarity computation sub-process, the similarity of each document $D_i$ with each other document $D_j$ in the cluster where it appears is computed. The cosine distance is used to compute the cosine angle between the vectors in the multidimensional space $R_d$ as a metric of their similarity, as, in one embodiment, shown below in Formula Two (F2).

$$\text{Cos}(Di, Dj)=(D_i \times D_j)/SQRT[D_i^2 \times D_j^2] \tag{F2}$$

From these individual similarities, the average similarity AVG $(D_i)$ of each document with respect to the rest of the documents in the cluster is computed. The formula for average similarity relative to documents in the cluster is shown below in Formula Three (F3). Let N be the number of documents in a cluster.

$$AVG(Di)=SUM[\text{Cos}(Di, Dj)]/N \text{ for } j=1 \ldots N \text{ and } j<>i \tag{F3}$$

A cluster average similarity AVG $(C_k)$ is computed from the average similarities of each document in the cluster $C_k$. The formula for computing cluster average similarity is shown below in Formula Four, (F4).

$$AVG(C_k)=SUM(AVG(D_i))/N \text{ for } i=1 \ldots N \tag{F4}$$

Referring to step 418 of FIG. 4, the process of identifying extraneous documents is performed. The document average similarity AVG $(D_i)$ is used as a metric of how much cohesion exists between a given document $D_i$ and the rest of the documents in the cluster. If the similarity is high, it means that the document fits nicely in the cluster where it appears. However, if the similarity is low, it means that it is an extraneous document in the cluster where it was erroneously placed. It is noted that low is a subjective term, such that how "low" the similarity has to be for a document to be considered extraneous.

It is further appreciated that a mechanism for setting a similarity threshold that establishes the boundary between extraneous and non-extraneous documents in a cluster is needed, in one embodiment of the present invention. This similarity threshold is dependent upon the magnitude of the deviation from the cluster average similarity AVG $(C_k)$ that will be allowed for the average similarity AVG $(D_i)$ of a document $D_i$. For this computation, a standard deviation for a cluster $C_k$ is used, in one embodiment, in, Formula Five (F5) as shown below.

$$S(C_k)=SQRT\{SUM[AVG(D_i)-AVG(C_k)]^2/(N-1)\} \text{ for } i=1 . \tag{F5}$$

Subsequently, each document average similarity, AVG $(D_i)$, is standardized to a Z score value using, Formula Six (F6) as shown below.

$$Z(AVG(D_i))=[AVG(D_i)-AVG(C_k)]/S(C_k) \tag{F6}$$

This indicates how many standard deviations the document average similarity AVG $(D_i)$ is off the cluster average similarity AVG $(C_k)$.

By inspecting the Z score values of known extraneous documents, we can set the threshold for the Z value above which a document is considered a candidate extraneous document in the cluster where it appears. To support the decision made on the threshold setting, in one embodiment, a Chebyshev theorem which says that for any data set D and a constant K>1, at least $1-(1/K^2)$ of the data items (in this example, documents) in D are within K standard deviations from the means or average was used. It is appreciated that alternative theorems can be utilized to support the threshold setting.

For example, for K=1.01, at least 2% of the data items are within the K=1.01 standard deviations from the means whereas for K=2, the percentage increases to 75%. Therefore, when K is larger, the more data items (documents) are within K standard deviations and the fewer documents are identified as extraneous candidates. Correspondingly, when K is smaller, fewer documents are within a smaller number of standard deviations and more documents exceeding this number are considered extraneous candidates. Thus, this translates into a common tradeoff between precision and recall. If we want more precision, i.e. more non-extraneous documents not being identified as extraneous candidates (more true negatives), the price is on extraneous documents that will be missed (more false negatives) which decreases the recall. On the other hand, if we want to augment the recall, i.e. identify more actual extraneous documents as extraneous candidates (more true positives), precision will decrease when non-extraneous documents are identified as extraneous candidates (more false positives).

The Coefficient of Dispersion is used to assess the effect of the setting of the threshold value of a cluster which expresses the standard deviation as a percentage. The Coefficient of Dispersion can be used to contrast the dispersion value of a cluster with and without the extraneous document, as is shown below in Formula Seven (F7).

$$V(C_k)=[S(C_k)/AVG(C_k)] \times 100 \tag{F7}$$

Still referring to step 418 of FIG. 4, the extraneous candidates can be filtered out, either manually or automatically. Automatically, in this instance, means that all the extraneous candidates will be eliminated from their clusters. In this case, the threshold setting is more critical since non-extraneous documents will unavoidably be eliminated as extraneous ones, and extraneous documents will unavoidably be missed. Manual, in this instance, is meant to assist a domain expert for whom it is easier to reject a false extraneous document than to identify missed extraneous documents. Therefore, in this mode, more importance is given to recall than to precision. The candidates are highlighted when the documents of a hot topic are displayed, so that the domain expert either confirms or rejects the document as extraneous to the topic.

In step 420 of FIG. 4, and subsequent to the clusters having been cleaned up by determining document similarity and removing (filtering) extraneous documents, as described above, a label has to be given to each cluster to name the topic that it represents. In one embodiment, labels can be assigned either manually or automatically. Manual labeling is done by a human who inspects the documents in a cluster and, using their experience and background knowledge, assigns a semantic label to the topic represented by the cluster. Automatic labeling is done by analyzing the words in the documents of a cluster to find the L most common words that appear in at least half of the documents and that will be used to label the cluster.

Still referring to step 420 of FIG. 4, the labeling, as described above, can be accomplished using several alternatives. In one alternative, the label is derived from the query words in the vector representation of the query view of the documents. In another alternative, the content words in the vector representation of the contents view of the documents are used. In using content words, there are two orthogonal sets of additional options that can be combined in any way. A first set of options provides a choice for the kind of content words to use for labeling, e.g., non-stop words, nouns or noun phrases. Nouns and noun phrases require a PoS (part-of-speech) tagger and a noun phrase recognizer, respectively. A LinguistX platform library from Inxight Corporation of Santa Clara, Calif., was used to provide the PoS tagger and a noun phrase recognizer. It is noted that nearly any PoS tagger and noun phrase recognizer can be used. A second set of options provides a choice to use only the titles of the documents or the whole contents of the documents to extract from them the non-stop words, the nouns or the noun phrases.

The search process required for self-solving problems can be done either by navigating through topic ontology, when it exists, or by doing a keyword search. The disadvantage of using topic ontology is that it frequently doesn't match the customer's perception of problem topics, making the navigation counterintuitive. This search mode is more suitable for domain experts, like support engineers, who have a deep knowledge of the contents of the collection of documents and therefore of the topics derived from it. In the keyword search mode the user knows the term(s) that characterize their information needs and uses it to formulate a query. The disadvantage of this search mode is that the keywords in the query not only occur in documents that respond to the user's information need, but also in documents that are not related to it at all. Therefore, the list of search results is long and tedious to review. Furthermore, the user often uses keywords that are different from the ones in the documents, so he has to go into a loop where queries have to be reformulated over and over until he finds the right keywords.

However, by applying embodiments of the present invention to the various logs, e.g. logs shown in Tables One, Two and Three, those hot topics that match the user's perspective are discoverable as well as document groups which correspond to the hottest problems that customers are experiencing. When these hot topics are made directly available on the web site, customers can find solution documents for the hottest problems straightforwardly. Self-solving becomes very efficient in this case.

Still referring to FIG. 4, although a specific set of steps or processes are described above, embodiments of the present invention are well suited to include variations on those steps and processes and alternative steps and processes. It is appreciated that some steps for which alternatives exist are further described below. It is further appreciated that experimentation was required on some of the steps/processes to evaluate available alternatives.

For example, in one embodiment, in the clustering step (step 408 and 416 of FIG. 4), a SOM-PAK implementation of Kohonen's Self-Organizing Map (SOM) algorithm was used.

Figure 5:
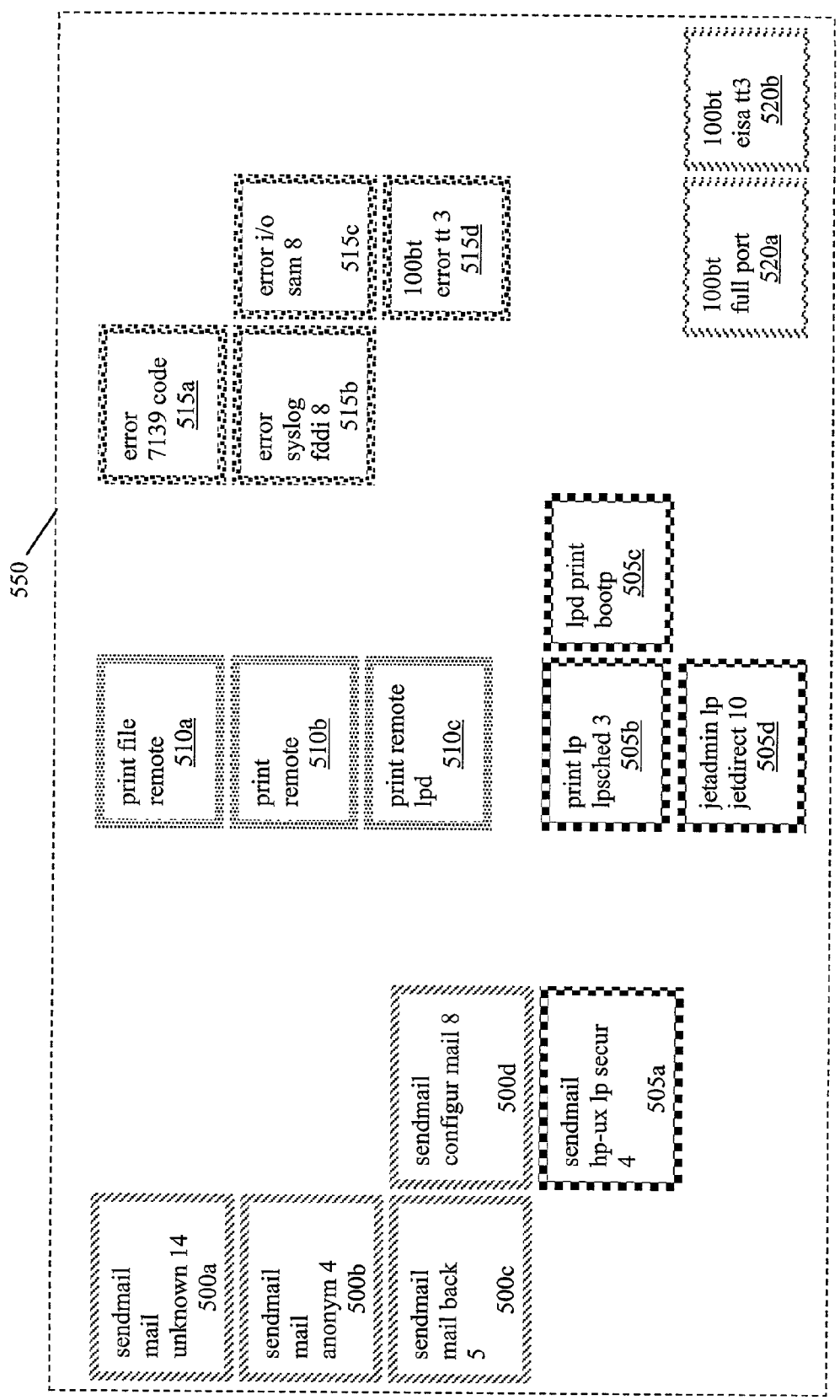
FIG. 5 is an illustration of a graphical display showing nodes within a self-organizing map, in accordance with one embodiment of the present invention.

The output of SOM-PAK allows for an easy implementation of the visualization of the map, which in turn facilitates the analysis of the evolution of topics. One example of an implementation produces a map that appears like the partial map 550 shown in FIG. 5. It is appreciated that nearly any browser software can be utilized to display partial map 550. Browser examples include, but is not limited to, Internet Explorer by Microsoft, Navigator by Netscape, Opera by Opera, and the like. In partial map 550, each cell represents a topic; the more related topics are, the closer they appear in the map. As can be observed in FIG. 5, there are several cells that have overlapping labels, such as, for example, the four upper left cells whose labels contain the word "sendmail," as indicated by cells 200a–d. Other examples of overlapping cells in partial map 550 of FIG. 5 include; cells 510a–c labeled "print remote;" cells 505a–d labeled "lp;" cells 515a–d labeled "error;" and cells 520a and b labeled "100bt." Overlapping labels gave us an indication that the cells represent subtopics of a more general topic. In order to discover these more general topics, we applied clustering again, but this time on the centroids (e.g., representatives) of the clusters obtained in the first clustering. Centroids cluster naturally into topics that generalize first level topics (subtopics). To better visualize these higher-level clusters, in one embodiment, the cells were labeled with different outer-edge border patterns, according to the higher-level cluster in which they fell, as shown in FIG. 5. It is appreciated that to better differentiate between the topics of the cells, different fonts within the cell can be used, different cell colors can be utilized, different sized and shaped cells can be utilized, and/or a combination of colors, sizes shapes, fonts, and borders can be implemented in the cells to provide better visualization of the higher level clusters.

In the post-filtering stage, e.g., steps 412–416 of FIG. 4, the vector representation of the contents of documents can be derived in different ways depending on which words are taken into account for their content view and the value of K in the modified TF-IDF formula used to transform these views to vectors. One alternative incorporates a) occurrences of non-stop words in the titles of the documents. Another alternative incorporates b) occurrences of non-stop words in the entire contents of the documents. Yet another alternative incorporates c) the same as b) but using K>1 in equation (I) when the word appears in the title. Still another alternative incorporates d) query words in the query view of the documents of the cluster where the document fell that occur in the documents. Yet another alternative incorporates e) occurrences of the first P words in the documents (solution documents usually contain the problem description at the beginning).

However, labeling is a difficult problem and our results often didn't give us completely meaningful labels. For example, in FIG. 8 the label "y2k 10.20 patch" might be interpreted as a topic on patches for HP-UX 10.20 for Y2K compliance which seems fine according to the documents in that topic, but in FIG. 6 the label "sendmail mail unknown" is not as easy to interpret and can only be interpreted as a topic related to "sendmail" problems.

Once the topics are found and labeled, the corresponding SOM map visualization is created on a web page that lets us analyze the topics obtained. It is noted that this visualization, as shown in FIG. 5, is not conventionally intended for viewing by the customer, but can be if so desired. By clicking on the label of a cell, e.g., cell 500a (located at node 0,0 within partial map 550 of FIG. 5), cell 555c (located at node 12,2 within partial map 550 of FIG. 5, but not visible in this view), or cell 596b (located at node 32,10 within partial map 550 of FIG. 5, also not visible), the contents of the topic in terms of its hottest documents is displayed in another web page, as shown in FIGS. 6, 7, and 8, respectively.

With respect to FIGS. 6, 7, and 8, it is noted that the presented web pages, web pages 650, 750, and 850 show examples of displaying the information that is contained within the cells of FIG. 5. It is noted that the web pages shown in FIGS. 6, 7, and 8 are illustrative in nature and should not be construed as limiting as to web page design and/or content.

In FIGS. 6, 7, and 8, each web page display, 650, 750, and 850, respectively, show a title header 610, 710, and 810, where the location of the cell, as a node, is disclosed. For example, the left upper corner cell in FIG. 5, e.g., cell 500a, is located at node 0,0, as well as the hot topic contained therein, as indicated in title header 610 of FIG. 6. Each web page display further shows a SOM label 611, 711, and 811 disposed underneath title header 610, 710, and 810, respectively. A SOM label indicates the topic in which the cluster is placed, e.g., 611 of FIG. 6 indicates a SOM label topic of sendmail. Each web page, 650, 750, and 850, of FIGS. 6, 7, and 8, respectively, is also shown to have a PRONTOID column (612, 712, and 812, respectively) where the document number of each document is listed. Clicking on the document number will retrieve that particular document.

Still referring to FIGS. 6, 7, and 8, web pages 650, 750, and 850, also show a document title column 613, 713, and 813, respectively, which shows the title of the document.

In the web pages 650, 750, and 850, shown in FIGS. 6, 7, and 8, respectively, all the documents that fall into the corresponding cluster are listed, and the ones that the post-filtering stage found as extraneous are displayed in lighter gray colored text. Alternatively, different text colors, e.g., red, yellow, and nearly any other color may be used. Additionally, different font sizes and/or font patterns can be used to better visibly depict the extraneous documents. FIGS. 6, 7, and 8 also show that postfiltering can never be perfect, and that a compromise has to be made between recall and precision. FIG. 8 shows postfiltering was totally successful in identifying all the extraneous documents (document 151212, 158063 and 158402), as indicated by lighter colored text. FIG. 6 shows partial success in identifying extraneous documents, since not only were all the extraneous documents identified (document 150980), but non-extraneous documents were identified as extraneous as well (documents 156612 and 154465). Finally, FIG. 7 shows a total failure in identifying extraneous documents since there are no extraneous documents but two of them were identified as such (documents 159349 and 158538). This might happen in any cluster that doesn't contain extraneous documents since the similarity of some documents, even if it is high, may be under the similarity threshold if the standard deviation is very small. To avoid this problem, the standard deviation in each cell has to be analyzed and if it is very small post-filtering won't be applied to the cell.

While FIG. 4, one embodiment of the present invention, describes a method of providing high-quality hot topics while filtering extraneous documents that is comprised of four stages, in another embodiment, more stages can be implemented. In another embodiment, fewer stages can be used, and in yet another embodiment, stages can be combined, such as those described in FIG. 2 and FIG. 3. Accordingly, it is appreciated that the number of stages used to properly provide high-quality hot topics is dependent, in part, upon the domain subject into which the documents relating to the hot topics are categorized. Accordingly, the stages, as have been described above, are to be considered exemplary, to be thought of as illustrative to more particularly describe the method of providing high quality hot topics while filtering extraneous documents, and should not be construed as exhaustive.

It is noted that while the hot topics discovered utilizing the method, as described in FIGS. 2, 3, and 4, matched the user's perspective, other hot topics were discovered that were not in the existing topic hierarchy, either because they were just emerging, like the topic Y2K, or because support engineers need a different perspective of the content of the collection than corresponds to organizational needs, or simply because they were not aware of the manner in which problems are perceived by users. Accordingly, embodiments of the present invention are also well suited to discovering; new topics that were hot at a given moment, aiding in discovering hot topics relative to a user's terminology, how much corresponding content existed, and the clicking behavior of customers when trying to self-solve problems belonging to a given topic.

Companies who are aware of the most common interests of their customers, have a great advantage over their competitors. Those companies can respond better and faster to their customer's needs, increasing customer satisfaction, and gaining loyal customers. In particular, for customer support, it is essential to be cognizant of the current hottest problems or topics that customers are experiencing in order to assign an adequate number of experts to respond to them, or to organize the web site with a dynamic hot topics service that helps them to self-solve their problems efficiently. Embodiments of the present invention have been presented in the method and system, as described above, and implemented, in one embodiment, to automatically mine hot topics from the web log and other logs that record data relevant to the users interests. The advantage of embodiments of the present invention is not only that it obtains hot topics but also that these topics correspond to the users' perspective and their quality can be tuned according to the desired values of precision and recall.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilized the invention and various embodiments with various modifications as are suited to the particular use contemplated. It is intended that the scope of the invention be defined by the claims appended hereto and their equivalents.

What is claimed is:

1. A method of content filtering in a discovered topic comprising:
   collecting querying data contained in a log said querying data having caused a retrieval of a collection of documents;

preprocessing said querying data, wherein said preprocessing comprises;
cleaning said querying data;
transforming said querying data into a querying data vector; and
clustering said querying data based on said querying data vector; and
postfiltering a collection of documents, said postfiltering comprising;
collecting actual document content data, said actual document content data related to documents which were retrieved based on said querying data contained in said log;
preprocessing said actual document content data, wherein said preprocessing comprises:
cleaning said actual document content data;
transforming said actual document content data into a document content data vector; and
clustering said collection of actual documents content data based on said document content data vector;
wherein said postfiltering performs a similarity computation between said querying data cluster and said actual content data cluster to generate a collection of documents having content similar to said querying data wherein extraneous subject matter documents are excluded from said collection of documents.

2. The method as recited in claim 1 further comprising labeling said collection of documents having subject matter similar to said querying data.

3. The method as recited in claim 1 wherein said preprocessing said querying data comprises collecting information regarding said querying data for utilization in determining said discovered topic, said querying data retrieved from a plurality of search logs.

4. The method as recited in claim 1 further comprising transforming each of said querying data into a matrix of query based numerical vectors.

5. The method as recited in claim 1 wherein said clustering comprises application of clustering software to query based document vectors for the subsequent grouping thereof, and wherein said query based document vectors comprise the input of said clustering software, and wherein the output is a cluster and wherein said cluster is indicative of said collection of documents.

6. The method as recited in claim 1 wherein said postfiltering comprises collecting said contents of said documents retrieved by said querying data from a database.

7. The method as recited in claim 1 further comprising cleaning said contents of said documents.

8. The method as recited in claim 7 further comprising transforming each of said cleaned documents into a matrix of content based document vectors.

9. The method as recited in claim 8 further comprising clustering said content based document vectors and wherein the similarity of each of said documents within said cluster is determined.

10. The method as recited in claim 9 wherein the determined similarity of each of said documents in said cluster is utilized as a metric to measure cohesion between said documents, and wherein a high measure of cohesion is indicative of a document containing said preferred subject matter, and wherein a low measure of cohesion is indicative of a document containing said extraneous subject matter.

11. In a web based environment, a method of topic discovery and content filtering comprising:

receiving a query causing a retrieval of a collection of documents related to said query, said collection of documents comprising documents having content comprising extraneous subject matter and documents having content comprising desired subject matter;
storing said query in a log;
collecting query data contained in said log;
preprocessing query data, said query data information pertaining to said query, wherein said preprocessing comprises:
cleaning said query data;
transforming said query data into a query data vector; and
clustering said query data enabling discovery of a topic relative to said query; and
postfiltering said retrieved collection of documents, said postfiltering comprising:
collecting actual document content data, said actual document content data related to documents which were retrieved based on said querying data contained in said log;
preprocessing said actual document content data, wherein said preprocessing comprises:
cleaning said actual document content data;
transforming said actual document content data into a document content data vector; and
clustering said collection of actual documents content data based on said document content data vector;
wherein said postfiltering generates a collection of documents having content comprising said desired subject matter relative to a discovered topic.

12. The method as recited in claim 11 further comprising labeling said collection of documents in accordance with a metric based upon document similarity, said metric used to measure cohesion between said documents, wherein a high measure of cohesion indicates a document containing said desired subject matter related to said discovered topic.

13. The method as recited in claim 11 wherein said preprocessing said query data comprises collecting data of said query, said data stored in a search log.

14. The method as recited in claim 11 further comprising performing a vector transformation upon said query data, resulting in a matrix of query based document vectors.

15. The method as recited in claim 11 wherein said clustering of said query data comprises applying clustering software to said query based document vectors.

16. The method as recited in claim 11 wherein said postfiltering said retrieved documents comprises collecting the contents of said retrieved collection of documents.

17. The method as recited in claim 11 wherein said postfiltering said retrieved collection of documents further comprises a vector transformation applied to the contents of said documents of said retrieved collection of documents.

18. The method as recited in claim 11 wherein said postfiltering said retrieved collection of documents further comprises clustering said content based document vectors, wherein a cluster of said content based document vectors enables similarity determination of each document of said retrieved collection of documents within said cluster, and wherein a high measure of similarity is indicative of a document containing said preferred subject matter, and wherein a low measure of similarity is indicative of a document containing said extraneous subject matter.

19. A computer system comprising:
a bus;
a display device coupled to said bus;

a storage device coupled to said bus; and
a processor coupled to said bus, said processor for;
collecting querying data contained in a log;
preprocessing said querying data, wherein said preprocessing comprises:
cleaning said querying data;
transforming said querying data into a querying data vector; and
clustering said querying data based on said querying data vector; and
postfiltering a collection of documents, said postfiltering comprising:
collecting actual document content data, said actual document content data related to documents which were retrieved based on said querying data contained in said log;
preprocessing said actual document content data, wherein said preprocessing comprises:
cleaning said actual document content data;
transforming said actual document content data into a document content data vector; and
clustering said collection of actual documents content data based on said document content data vector;
wherein said postfiltering performs a similarity computation between said querying data cluster and said actual content data cluster to generate a collection of documents having content similar to said querying data wherein extraneous subject matter documents are excluded from said collection of documents; and
labeling said collection of documents in accordance with a metric based upon document similarity, said metric used to measure cohesion between said documents in said collection of documents, wherein a high measure of cohesion indicates a document containing subject matter relative to said a topic, said topic displayed to a user via said display device.

20. The computer system of claim 19 further comprises;
performing a vector transformation upon said data, resulting in a matrix of query based document vectors.

21. The computer system of claim 20 wherein said clustering of said query data comprises applying clustering software to said query data vectors.

22. The computer system of claim 19 wherein said postfiltering said retrieved documents comprises:
performing a vector transformation upon said contents of each of said documents of said retrieved collection of documents, wherein content based document vectors are used to determine content similarity of said retrieved documents; and
clustering said content based document vectors, wherein a cluster of content based document vectors enables determining the similarity of each of said retrieved document within said cluster, and wherein a high measure of similarity is indicative of a document containing said preferred subject matter, and wherein a low measure of similarity is indicative of a document containing said extraneous subject matter.

* * * * *

UNITED STATES PATENT AND TRADEMARK OFFICE
CERTIFICATE OF CORRECTION

PATENT NO. : 7,146,359 B2 Page 1 of 1
APPLICATION NO. : 10/138950
DATED : December 5, 2006
INVENTOR(S) : Maria G. Castellanos It is certified that error appears in the above-identified patent and that said Letters Patent is hereby corrected as shown below:

Title page, Item (57), under "Abstract", line 6, delete "said" and insert -- the --, therefor.

In column 12, line 7, in equation (F5), delete "i=1 ." and insert -- i=1..N --, therefor.

In column 16, line 65, in Claim 1, after "log" insert -- , --.

In column 17, line 2, in Claim 1, delete "comprises;" and insert -- comprises: --, therefor.

In column 17, line 9, in Claim 1, delete "comprising;" and insert -- comprising: --, therefor.

In column 18, line 27, in Claim 11, delete "documents" and insert -- document --, therefor.

In column 19, line 2, in Claim 19, delete "for;" and insert -- for: --, therefor.

In column 19, line 22, in Claim 19, delete "documents" and insert -- document --, therefor.

In column 20, line 5, in Claim 19, delete "said" before "a topic".

Signed and Sealed this

Twenty-eighth Day of April, 2009

JOHN DOLL
*Acting Director of the United States Patent and Trademark Office*